Nov. 25, 1952  H. W. RILEY ET AL  2,618,921
TWIN SIDE DELIVERY RAKE

Filed May 13, 1947  3 Sheets-Sheet 1

INVENTORS
HOWARD W. RILEY
EDWIN S. HARRISON
BY Carlson Pitzer Hubbard & Hogle
ATTORNEYS

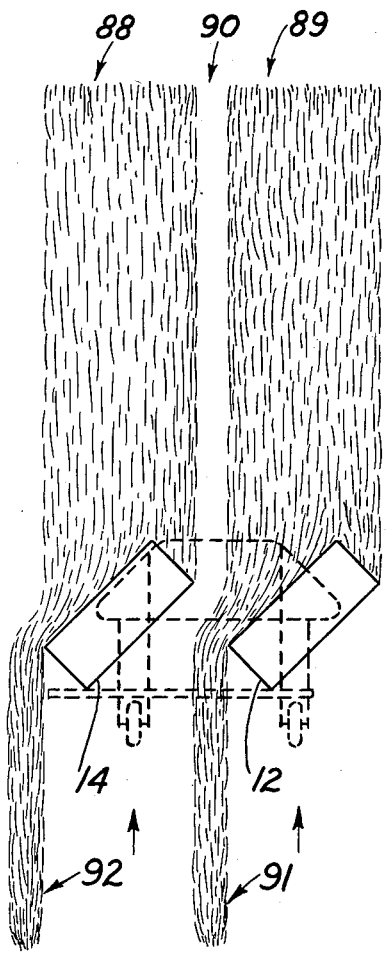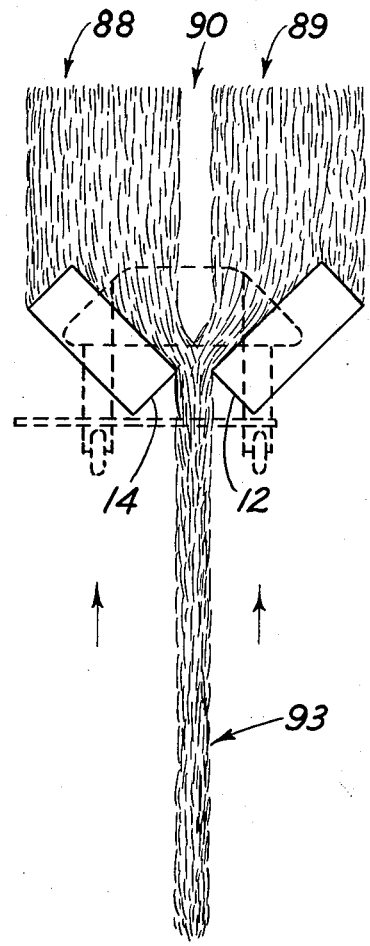

Nov. 25, 1952    H. W. RILEY ET AL    2,618,921
TWIN SIDE DELIVERY RAKE
Filed May 13, 1947    3 Sheets-Sheet 3
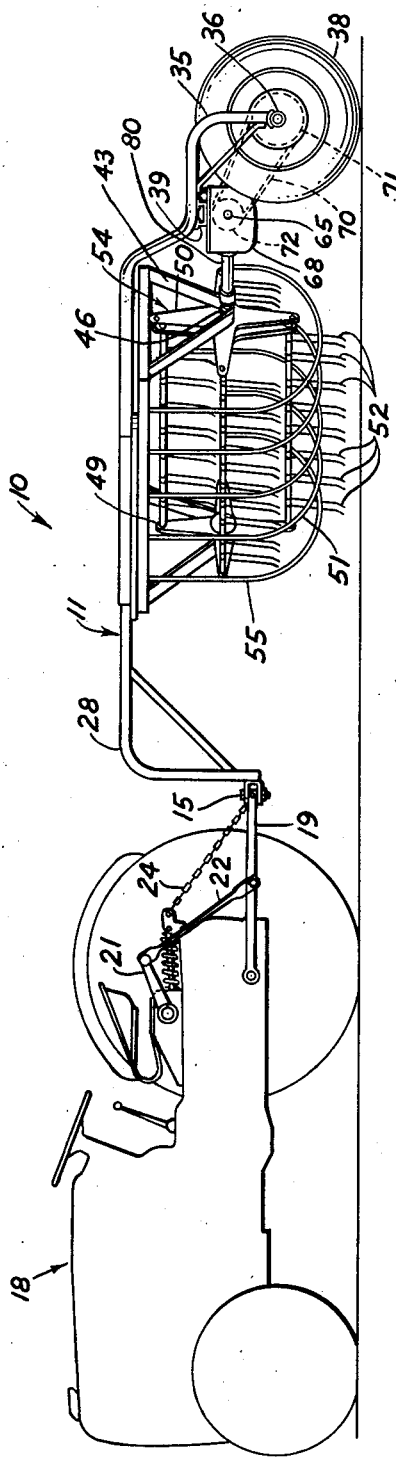
Fig. 4
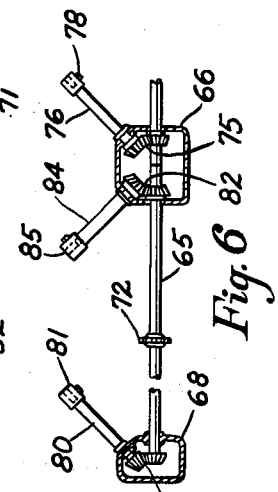
Fig. 6
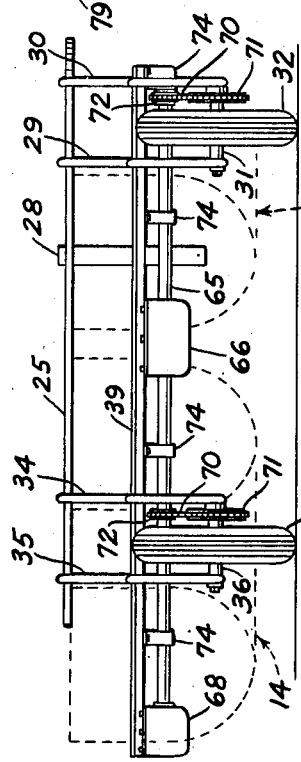
Fig. 5
INVENTORS
HOWARD W. RILEY
EDWIN S. HARRISON
BY
ATTORNEYS Patented Nov. 25, 1952

2,618,921

UNITED STATES PATENT OFFICE 2,618,921

TWIN SIDE DELIVERY RAKE

Howard W. Riley, Ithaca, and Edwin S. Harrison, Camden, N. Y., assignors to Harry Ferguson, Inc., Detroit, Mich., a corporation of Delaware Application May 13, 1947, Serial No. 747,626

2 Claims. (Cl. 56—377)

The present invention relates to an improvement in rakes of the side delivery type.

It is a function of a side delivery rake to gather pre-cut and partially cured hay into windrows in order to control the curing process and to put the hay into condition for subsequent loading and removal. Side delivery rake employing an angularly arranged raking reel have been used for this purpose in the past, and have been built in progressively greater widths in an attempt to decrease the time required for raking. While it is true that the use of a wider rake enables a given field to be covered in a lesser number of passes, our observations indicate that the use of conventional rakes is accompanied by a number of serious disadvantages.

In the first place the use of a side delivery rake having a relatively wide raking reel correspondingly increases the distance that much of the hay must be moved transversely to the path of implement travel. During the course of such movement the hay from the forwardly projecting end of the reel must be moved substantially the full width of the raked strip and subjected to agitation by succeeding portions of the reel in turn before being finally deposited in a windrow at the trailing end thereof. This has usually resulted in a considerable loss of leaves, the most valuable part of the hay crop. Further, in the course of such movement the hay is rotated or twisted, often to the extent of several revolutions, and consequently the windrow is deposited in a compact "roped" condition rather than being in a desired loose and fluffy state. The latter condition is further aggravated by the fact that a conventional wide reel builds up a windrow, under heavy hay conditions, which far exceeds the optimum size and density. Nor can the size of such windrow be reduced without increasing the number of passes which must be made to completely rake the field. Both "roping" and the excessive size and density of a windrow, particularly under heavy hay conditions, tend to prevent the free admission of air and sunlight essential to the proper curing of the hay. Such heavy windrows are also often found to be too large for the best operation of pick-up hay balers.

In the course of basically correcting the difficulties noted above, it has been helpful, first, to consider the condition of the hay in a field as left by a modern mower in condition for raking. The field under such circumstances is not evenly covered with hay but, on the contrary, contains parallel swaths of hay usually separated by cleared strips left by the mower swath board. The width of such swaths is generally less than the width of a conventional side delivery rake so that such rake must normally rake one swath and a portion of the adjacent swath. The lack of any definite relationship between the rake and the swaths not only requires that the cleared strips be raked, thereby preventing full use of the raking capacity of the implement, but also requires that the tractor run over and damage the cut and partially cured hay.

We have found that raking may be more efficiently and satisfactorily accomplished by carefully coordinating the rake structure to the width and spacing of the swaths left by a mower and by causing adjacent swaths to be raked individually and completely in a single pass. Further, to reduce leaf loss and roping, it has been found desirable to minimize the distance through which the hay must be transported laterally to a windrow so that it does not exceed one swath width under any circumstances. In addition to the foregoing requirements it is also desirable, under heavy hay conditions, to be able to reduce the size and density of the windrow without affecting in any way the amount of hay raked with the implement per unit time. Conversely, provision should be included for depositing a maximum amount of hay in a single windrow under light hay conditions or when the sun is unusually hot.

Accordingly, it is a primary object of the present invention to provide an improved high capacity side delivery rake in which the hay is subject to a minimum of twisting and mechanical agitation, thereby reducing leaf loss and producing a loose fluffy windrow structure.

It is another object of the invention to provide a side delivery rake in which the raking members are so coordinated with the width and spacing of swaths left by a conventional mower that a plurality of adjacent swaths may be individually and completely raked, thus greatly reducing the necessity for the tractor to run over cut and partially cured hay and making it unnecessary for a raking member to sweep over the cleared strip which may be left by the mower swath board.

It is a further object of the invention to provide a side delivery rake which has a capacity comparable to or greater than conventional wide reel rakes but which may be readily adapted for either of two modes of raking thereby to produce a windrow of a size and density best suited to the weather and crop conditions existing at the time of raking.

More particularly stated, it is an object to provide a side delivery rake in which the hay raked from a strip may be discharged alternatively into a single windrow or into two separate windrows and in which no part of the hay is laterally transported more than one half of the width of the strip.

Other objects and advantages of the invention will be apparent from the following detailed description taken in connection with the accompanying drawings, in which:

Fig. 2 is a schematic plan view showing the use of the rake of Fig. 1 in one of its modes of operation.

Fig. 3 is a view similar to Fig. 2 but showing the reels adjusted for a second mode of operation.

Fig. 4 is a view in elevation of the side delivery rake shown in Fig. 1.

Fig. 5 is a rear elevational view of the side delivery rake disclosed in Figs. 1 and 2 and looking in the direction of the tractor.

Fig. 6 is fragmentary plan view in partial section showing the transverse drive shaft and stub shafts for coupling it to the reels.

Figure 1:
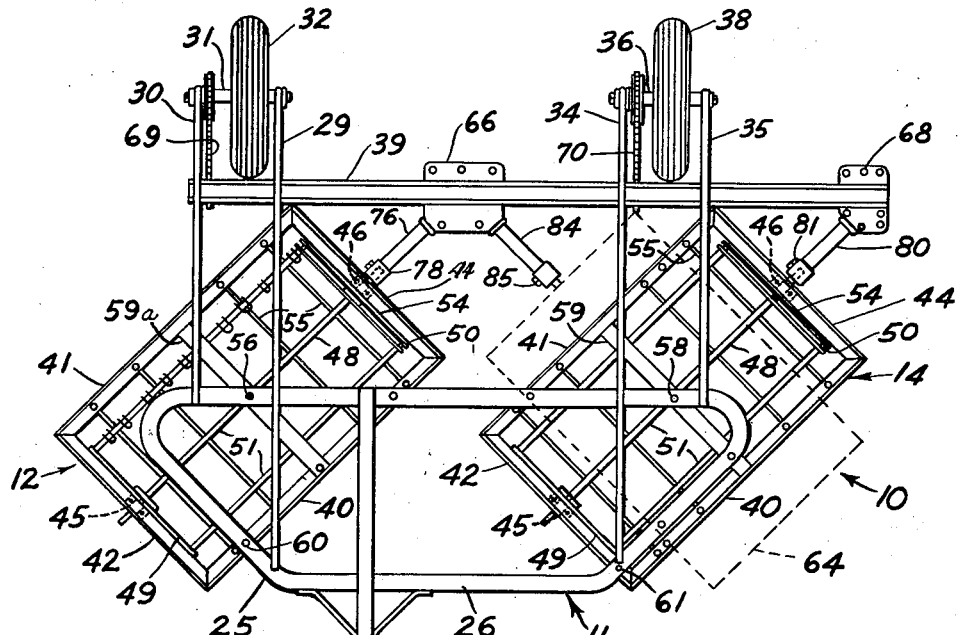
Figure 1 is a plan view of a twin side delivery rake constructed in accordance with out invention.

While the invention is susceptible of various modifications and alternative constructions and uses, we have shown in the drawings and will here describe in detail one embodiment of the invention. It is to be understood, however, that we do not intend to limit the invention by such disclosure, but aim to cover all modifications and alternative constructions and uses falling within the spirit and scope of the invention as expressed in the appended claims.

Referring now to the drawings, it will be seen that the exemplary rake indicated generally at 10 includes a main frame 11 and right and left hand reels which are carried thereby and designated as 12 and 14 respectively. Such reels are normally oriented with each of them at an angle of approximately 45° to the direction of movement, and while in such angled position are either in parallelism with each other or at right angles to each other as shown respectively in Figs. 2 and 3. Upon being rotatingly driven by a convenient source of power, the reels are effective to sweep clear a strip of cut hay, depositing such hay in a windrow adjacent the trailing end of the reel. It is by alternatively angling the reels toward each other as shown in Fig. 3, or arranging them in parallelism as shown in Fig. 2, that they are conditioned to discharge the hay correspondingly in one common windrow or into two separate windrows. Choice of set-up depends upon the crop conditions, as will later appear in more detail. But in either case the hay never has to be moved more than one swath width during raking.

In the present instance the main frame 11 has a draft connection 15 at its forward end which may be in the form of a clevis suitable for attachment to a tractor 18 by drawbar 16. The tractor connected to such drawbar and shown merely in outline form will be recognized as the well known Ford tractor with Ferguson system including a power lift mechanism of the type disclosed in Henry George Ferguson Patent No. 2,118,180 issued May 24, 1938. Since the construction and operation of the latter mechanism does not, of itself, form part of this invention, it will suffice to say that the hitch includes a pair of draft links 19, 20 which may be elevated by cranks 21 and drop links 22, the normal lowermost position of the links being determined by chains 24.

Upon inspection of Fig. 1 it will be seen that the main frame 11 includes a laterally extending right hand portion 25 and a left hand portion 26. Draft force is applied to the frame through a forwardly extending tongue 28 welded or otherwise fastened thereto and which may be offset as desired from the center line of the frame 11.

Extending rearwardly from the right hand portion 25 of the frame are a pair of longitudinal members 29, 30 which are bent downwardly at their rearmost ends as shown in Fig. 4 to engage the supporting axle 31 of a ground engaging wheel 32. Similarly the left hand side 26 of the main frame includes rearwardly extending members 34, 35 which engage the axle 36 of a second ground engaging wheel 38. Extending transversely across all four of the rearwardly extending members 29, 30, 34, 35 and welded or otherwise fastened thereto, is a transverse member 39 which, in addition to causing the main frame 11 to have increased rigidity, also serves as a support for the reel driving mechanism to be detailed.

Turning now to the reel structure, it will be seen that the two reels 12, 14, as such, are of substantially the same construction, identical reference characters being applied to corresponding structural elements of both reels. Individually, each reel includes a frame having horizontal side members 40, 41 and end members 42, 44. The latter have V-shaped depending brackets 43 which serve as supports for bearings 45, 46 engaging the respective ends of a cooperating reel shaft 48. Drivingly connected to the shaft 48 and mounted adjacent the ends thereof are spider members 49 and 50 respectively, the paired legs of which carry tooth supporting bars 51 parallel to the reel axis. Mounted along the length of such bars are hay engaging teeth 52 which, as shown in Fig. 4, point downwardly toward the ground. The teeth 52 are maintained in this direction at all times by a crank mechanism 54 at one end of the reel. Although the details of such mechanism are not shown in the drawings, numerous structures are shown in the prior art for keeping raking teeth directed toward the earth, and it will suffice to say that upon rotation of the spiders 49, 50 orbital sweeping or translatory movement will be imparted to the spring teeth 52 and the latter will tend to urge the hay perpendicularly to the axis of the reel. In order to prevent any hay from clinging to the teeth 52 as they are drawn upwardly at the end of the sweeping stroke, U-shaped strippers 55 are provided adjacent the teeth, being fastened at their upwardly projecting ends to the side members 40, 41 of the reel frame.

In accordance with the invention, means are, as heretofore noted, provided for causing the reels 12, 14 to discharge hay optionally into either a common windrow or two separate windrows. For that purpose provision is made for mounting the reels 12, 14 on the main frame 11 so that at least one of them may be rotatably adjusted about a vertical axis into either an outwardly or inwardly discharging position. A mounting enabling such angular adjustment may take any desired form, although in the present embodiment this is accomplished by reel frame pivots 56, 58 respectively which engage cross pieces 59, 59a centrally located with respect to the associated reel frame side members 40, 41 and bridgingly connecting the same. If desired bolts may be used for pivots 56, 58 and additional bolts 60, 61 may be employed to maintain the reel frames in a predetermined angular relationship, for example the parallel relationship shown in Fig. 1.

In the practice of the invention it is not necessary to maintain the reels in a raking position. If desired both of the reels 12, 14 may be rotated about the pivots 56, 58 respectively until the axes of the reels are approximately alined with the direction of movement of the tractor. When locked in such position, for example, by the bolts 60, 61, the rake assembly is in a compact condition suitable for transport.

More important, however, is the fact that one reel of the pair, in this case reel 14, may be rotated into an alternate position 64 (shown dotted in Fig. 1) substantially at right angles to the position illustrated. Such adjustment enables the rake to be used for the two distinct modes of raking disclosed in Figs. 2 and 3 and depending upon crop and weather conditions.

Prior to further discussion of such arrangement, it will be helpful to inspect the means here used for drivingly connecting the ground engaging wheels with the reel shafts 48. It will be noted in Fig. 4 that a transverse drive shaft 65 extends along the rear edge of the main frame, lying closely adjacent the transverse member 39. The transverse drive shaft 65 is comprised of two axial sections having their inner ends journaled in a central gear box 66 and having their outer ends respectively journaled in a left hand gear box 68 and a bearing 74, all of which are rigidly mounted on the transverse member 39. In the present embodiment the sections of shaft 65 are rotatively coupled to the ground engaging wheels 32, 38 by means of sprocket chains 69 and 70 respectively, which are trained over appropriate sprockets 71, 72.

To drive the reel 12 from the shaft 48 a geared connection is used consisting of a pair of bevel gears 75 (Fig. 6), a connected stub shaft 76 extending at an angle to the direction of movement of the vehicle, and a disengageable coupler 78 at the end of the stub shaft. The latter is so oriented with respect to the vertical pivot axis of the reel that the reel shaft 48 may be alined with it and the coupler attached to the presented end thereof. In the case of the reel 14 a similar function is performed by the bevel gears 79, the stub shaft 80, and the coupler 81, assuming that the reel frame is in the position shown in Fig. 1. When it is desired to drive the reel 14 in its alternative position indicated by the dotted outline 64, the driving connection is made to the other end of the reel by bevel gears 82, stub shaft 84 and a detachable coupler 85. Regardless of which driving connection is used for the reel 14, the spring teeth 52 will be caused to sweep over the ground forwardly but at an angle with respect to the direction of travel.

In order to fully appreciate the interrelation between the rake herein disclosed and the size and spacing of the swaths left by a conventional mower of modern design more detailed reference may be made to Figs. 2 and 3. As shown in Fig. 2, adjacent swaths, designated 88 and 89, are normally separated by a cleared strip 90, the latter resulting from the converging action of the mower swath board. As previously noted, conventional reels accommodate one swath and only part of an adjacent swath and must sweep over the cleared separating strip 90 as well.

In accordance with one aspect of the invention, raking the cleared strip 90 may be made unnecessary by so spacing the reels that adjacent portions thereof are separated by a gap which is of approximately the same width as the cleared strip although preferably somewhat wider. By directing the tractor so that the gap between the reels is alined with the cleared strip, the reels pass only over ground having severed hay thereon and the full raking capacity of the implement is therefore used.

Further, using the twin reel arrangement disclosed enables the width of each of the reels 12, 14 to be made sufficient to completely accommodate a single swath, and it is possible therefore to rake two swaths completely in a single pass. Since in the first and all subsequent passes the rake always bears a predetermined relationship to the swaths being raked, it is possible to position the implement tongue 28 on the frame 11 in a position which will cause the wheels on one or even both sides of the tractor to run in the cleared space between adjacent swaths. Consequently, damage to the cut hay due to run-over may be much less than in the case of a conventional rake.

It will be seen from Fig. 2 that as the tractor draws the raking reels over adjacent swaths 88, 89, the translatory or sweeping action of the spring teeth 52 collects the hay, depositing it in respective windrows 91, 92. It is apparent that the hay in a given one of the windrows is caused to move laterally through a comparatively small distance during such raking, no part of the hay moving more than approximately the forwardly projected width of one of the reels. Moreover, in this relatively short movement the tendency toward "roping" is greatly reduced and hay is formed into fluffy, easily cured, windrows. Because of the minimum amount of hay movement, leaf loss has been found to be considerably reduced, thereby conserving the most valuable portion of the hay crop.

In the event that the crop of hay is relatively heavy, it will be apparent that the twin rake, adjusted as shown in Fig. 2, will cause the hay to be deposited in two loose windrows thereby facilitating the curing process. Our invention contemplates, however, that when the crop is light or when the sun is so hot as to incur the danger of burning the hay before it is thoroughly cured, one of the reels may be oriented so as to enable both of the swaths 88, 89 to be raked convergently into the cleared space 90 to form a common windrow 93 (Fig. 3). This, as we have seen, is accomplished merely by rotating the frame of the reel 14 about the pivot 58 (clockwise in Fig. 1) so that it is approximately at right angles with respect to reel 12 and by engaging the power coupling 85 with the opposite end of the shaft 48.

It is apparent that by orienting the reels 12, 14 at right angles for convergent discharge a strip may be efficiently raked which is equally as wide as that raked in the other condition of adjustment. And even though all the hay thus raked is deposited in a single windrow, no part of the hay need move laterally more than approximately one-half the width of the strip raked in a single pass. In this respect the arrangement shown has also been found to be considerably more satisfactory than twin rakes in which the hay raked by one of the reels, generally termed a "leading" reel delivers its hay to a second or "following" reel.

Figure 1A:
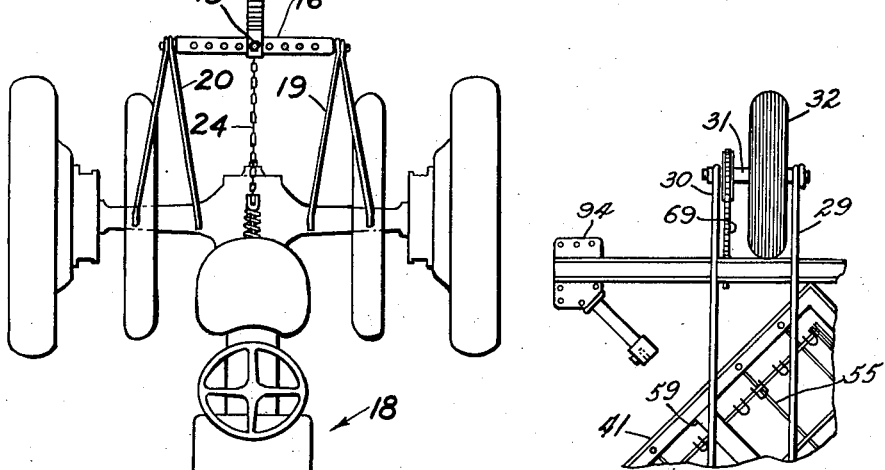
Fig. 1A is a fragmentary plan view similar to the upper left portion of Fig. 1 and showing an optional structural feature of the rake.

Although the right hand reel 12 has been described as adjustable to two positions, that is, the normal position and a transport position, it is entirely feasible to provide reel 12 for adjustment through the same angular range as reel 14. This may readily be accomplished as illustrated in Fig. 1A by extending outwardly the transverse member 39 and the associated shaft 65 and providing on the free ends of these structural elements a gear box drive 94 complemental to the drive 68. This would permit the user to arrange the reel in parallel angular relation to deliver hay optionally to the left or to the right, a feature particularly advantageous in raking irrigated land where the rake may be drawn back and forth across the field instead of around the field in one direction only. Under such circumstances the comparative lightness of the individual reels enables a change in reel adjustment to be readily effected by a single farmhand.

To transport the implement it is necessary merely to elevate the tractor hitch links, pivoting the main frame about the wheels 32, 38 as a fulcrum. Prior to transport, however, the reel drive connection should be disconnected and the reels swung so that their axes are substantially alined with the direction of motion.

The mounting structure for the reels 12, 14 can be assembled with sufficient play to enable each reel to be freely suspended with a small range of tilting movement relative to the main frame.

We claim as our invention:

1. A tractor mounted side delivery rake for gathering precut parallel rows of crops into windrows and designed for use with tractors of the two wheel drive type, comprising a horizontal main frame, means for supporting said frame from the rear end of a tractor in trailing relationship with respect thereto and in a horizontal position above the level of the ground, a pair of reel frames, a raking reel carried by each reel frame, suspension bearing means for pivotally mounting said reel frames in spaced relation at opposite sides of said main frame at respective points thereon in substantially identical trailing offset relation with respect to the paths of the driving wheels of the tractor, at least one of said suspension bearing means providing for horizontal swinging movement of its respective reel frame from a diagonally disposed normal crop-moving position overlying a crop row undergoing raking for outward discharge relative to the tractor path to an oppositely disposed diagonal crop-moving position overlying the same row for inward discharge thereof, the spacing between said reel frames and their offset relation with respect to the paths of said driving wheels being such that with the tractor wheels traveling longitudinally on the ground between adjacent rows respectively, said reel frames will overlie one row which is directly in the path of movement of the tractor and one row which is outwardly offset therefrom respectively.

2. A tractor mounted side delivery rake for gathering precut parallel rows of crops into windrows and designed for use with tractors of the two wheel drive type, comprising a horizontal main frame, means for supporting the forward end of said frame from the rear end of a tractor in trailing relationship with respect thereto, traction means for supporting the rear end of said frame from the ground with the frame extending horizontally above the level of the ground, a pair of reel frames, a raking reel carried by each reel frame, suspension bearing means for pivotally mounting said reel frames in spaced relation on opposite sides of said main frame at respective points thereon in substantially identical trailing offset relation with respect to the paths of the driving wheels of the tractor, at least one of said suspension bearing means providing for horizontal swinging movement of its respective reel frame from a diagonally disposed normal crop-moving position overlying a crop row undergoing raking for outward discharge relative to the tractor path to an oppositely disposed diagonal crop moving position overlying the same row for inward discharge thereof, the spacing between said reel frames and their offset relation with respect to the paths of said driving wheels being such that with the tractor wheels traveling longitudinally on the ground between adjacent rows respectively, said reel frames will overlie one row which is directly in the path of movement of the tractor and one row which is outwardly offset therefrom respectively, a reel driving shaft rotatively mounted on said main frame rearwardly of said reel frames and extending transversally of the main frame, a pair of take-off shafts operatively connected in driving relationship with respect to said driving shafts, means for selectively coupling the reel carried by said pivoted reel frame to said take-off shafts, one of said take-off shafts being positioned relative to the main frame to enable one of said coupling means to be effective when said latter reel frame is in one of its angular positions, and the other of said take off shafts being positioned to enable the other of said coupling means to be effective when said latter reel frame is in its other angular position, and means operatively connecting said driving shaft and traction means in driving relationship.

HOWARD W. RILEY.
EDWIN S. HARRISON.

REFERENCES CITED

The following references are of record in the file of this patent:

UNITED STATES PATENTS

| Number | Name | Date |
|---|---|---|
| 1,451,590 | Schweder | Apr. 10, 1923 |
| 2,436,475 | Jones et al. | Feb. 24, 1948 |

FOREIGN PATENTS

| Number | Country | Date |
|---|---|---|
| 517,070 | Great Britain | Jan. 19, 1940 |
| 540,513 | Great Britain | Oct. 20, 1941 |